May 10, 1966  J. HUDNALL ETAL  3,250,515
MOVEMENT CONTROL DEVICE
Original Filed June 26, 1961  2 Sheets-Sheet 1
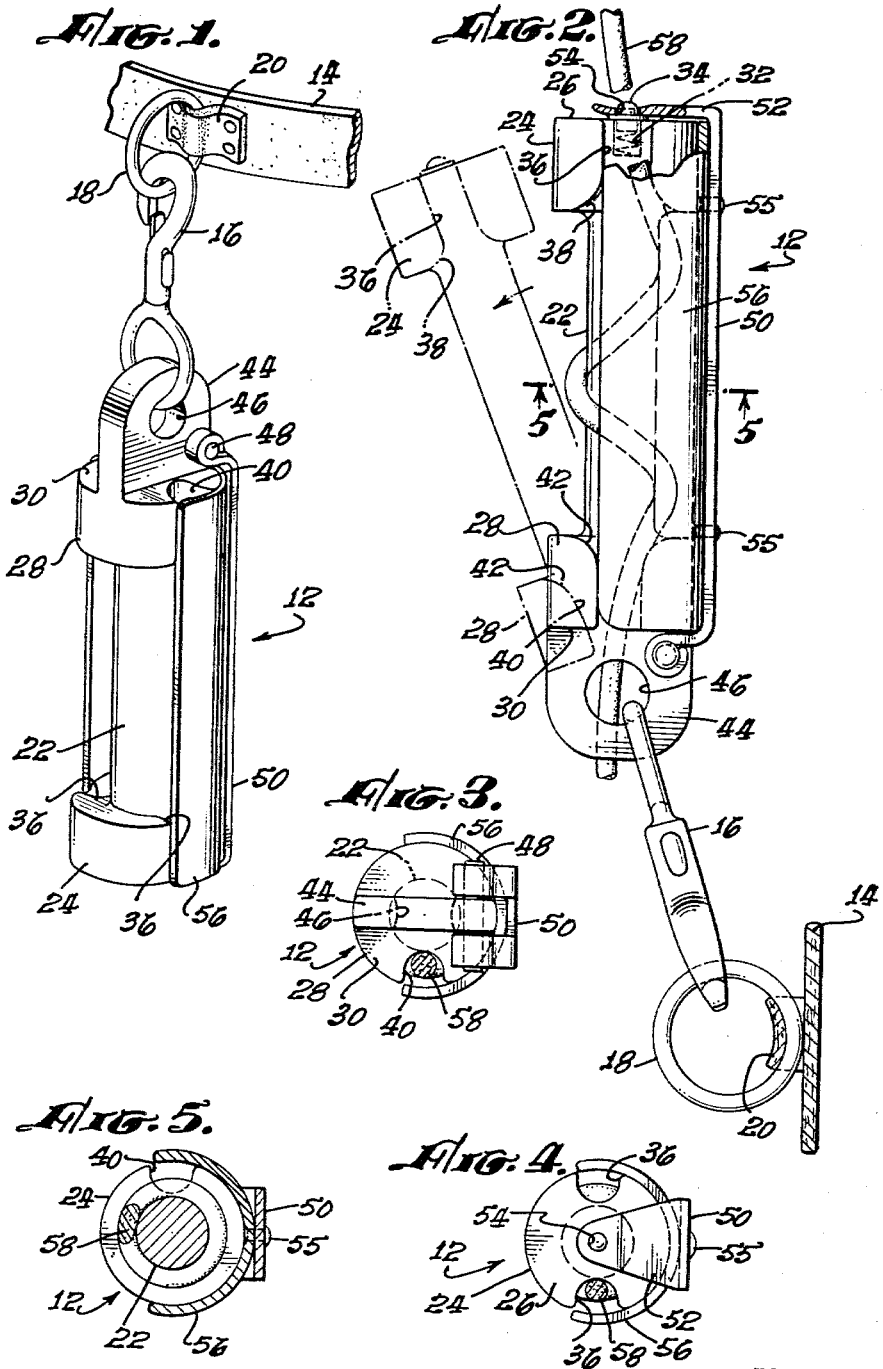
INVENTORS.
JOHN HUDNALL,
ROBERT W. ADAMS,
EDGAR E. HOLKESVICK,
BY THEIR ATTORNEYS
HARRIS, KIECH, RUSSELL & KERN

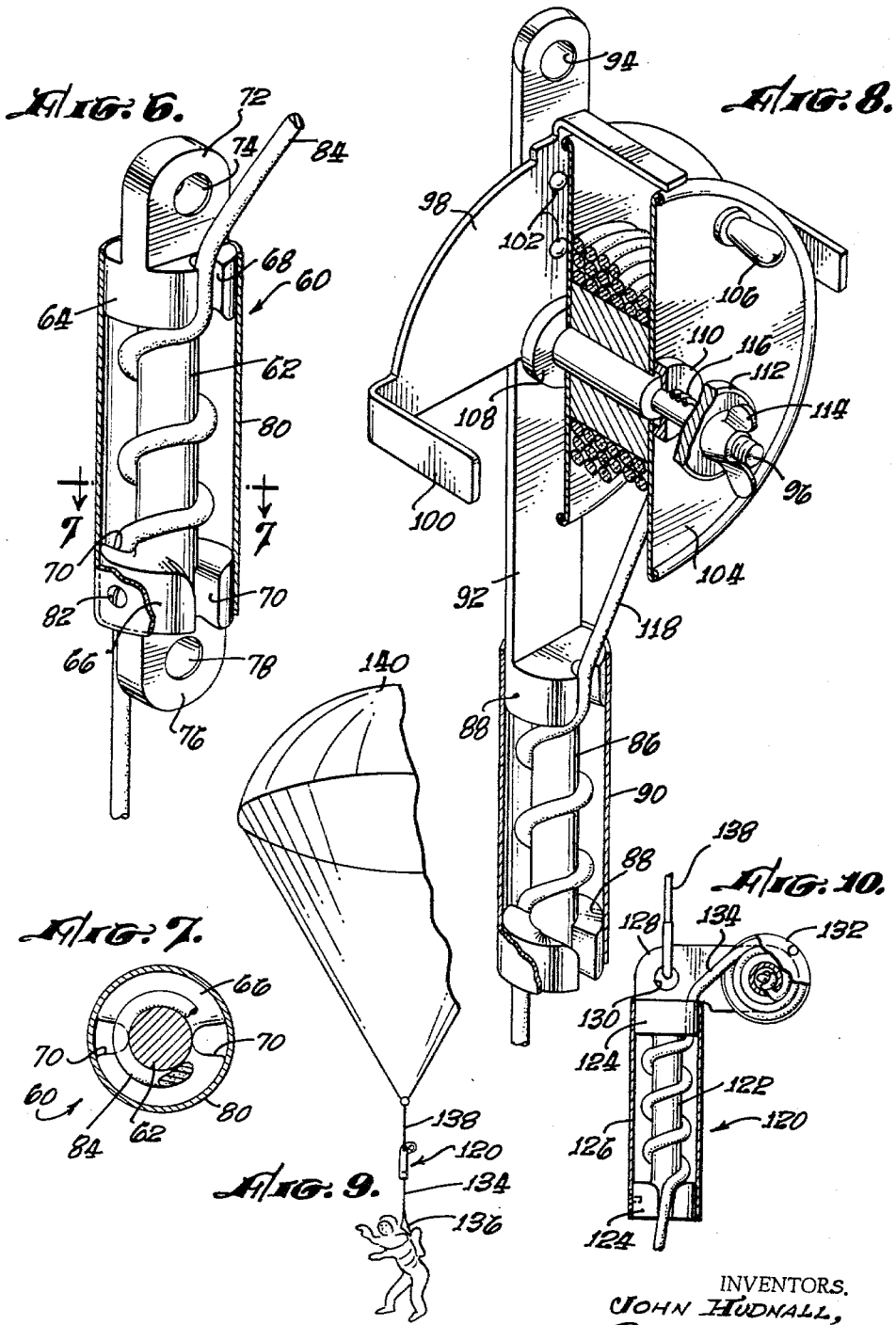

United States Patent Office 3,250,515
Patented May 10, 1966

3,250,515
MOVEMENT CONTROL DEVICE
John Hudnall, Lynnwood, Wash., and Robert W. Adams, Los Angeles, and Edgar E. Holkesvick, Fullerton, Calif., assignors, by mesne assignments, to Lewis H. Himmelrich, Newport Beach, Calif.
Continuation of application Ser. No. 119,692, June 26, 1961. This application July 12, 1963, Ser. No. 296,884
13 Claims. (Cl. 254—156)

This application is a continuation of application Serial No. 119,692, filed June 26, 1961, now abandoned.

The present invention relates generally to the equipment handling art and more particularly to a novel movement control device for controlling the vertical movement of heavy objects and individuals and for the controlled braking of fast moving vehicles and the like.

Briefly stated, one embodiment of the present invention comprises a body member having a shaft portion with a hub at each end thereof. Axially extending slots are contained in each hub for slidably receiving a rope which is twisted around the shaft, and a removable cover member at least partially encloses the slots to prevent the rope from moving transversely out of the slots during the operation of the device. A bracket is provided at one end of the body member for attaching it to a load, a support, or to the belt of a person who is to use the device.

At the present time cumbersome and expensive hoists and winches are required for lowering heavy objects from a height on construction projects and the like. In other situations, as for example in the trimming of trees, heavy limbs are permitted to fall freely to the ground with possible damage to property and persons nearby.

Turning to another field, at the present time construction workers, firemen, tree trimmers, steeple jacks, high-line workers, and the like must descend from elevated positions by means of ladders, bosuns chairs, and the like, or by laboriously climbing down a steel tower, wood pole, or tree trunk.

During rescue operations by helicopters and low flying aircraft, as when rescuing downed flyers from the ocean, the rescued person is often injured by the sudden shock which occurs when he is suddenly lifted from the water.

In still another field, the movement of aircraft on carriers and the movement of sleds used in testing rocket propulsion units is arrested by means of complicated expensive devices.

It is an object of the present invention, therefore, to provide a novel movement control device which is relatively inexpensive, extremely simple in construction and operation, and small in size, and which can be used for safely raising or lowering heavy objects under a controlled rate of speed or for slowing down the movement of vehicles and the like. More particularly, it is an object to provide such a device which can be used in combination with a rope for controlling the rate of movement of the rope therethrough. Specifically, it is an object to provide such a device for mounting on a rope or through which a rope can be moved, whereby the rate of relative movement between the device and the rope is controlled by the amount of frictional engagement therebetween.

Another object is to provide a novel descent control device which can be carried by individuals who work on elevated structures to be used by them in descending a rope at a controlled rate of speed under either normal or emergency conditions. More particularly, it is an object to provide such a device which is small and light in weight, and which can be carried on a workman's belt without interfering with his normal activities. Specifically, it is an object to provide such a device which can be carried on the belt of a workman and which can be easily and quickly connected to a rope which has its upper end fastened to a support, whereby the workman can quickly and safely descend to the ground under emergency conditions.

Yet another object is to provide a novel device of this type which can be used for safely braking fast-moving devices and objects. More particularly, it is an object to provide such a device, which, under braking conditions, provides for initial fast relative movement between the rope and the device (either of which can be attached to the vehicle being braked), followed by a reduced rate of relative movement therebetween.

Another object is to provide a novel descent control device which can be used for easing or reducing the impact or shock caused by the sudden opening of a parachute or the like. More particularly, it is an object to provide such a device which will provide an initial fast relative movement between the parachute and the object suspended therefrom followed by a relatively slow movement therebetween for a predetermined period of time, and then a simultaneous descent of the parachute and object supported thereby.

An additional object is to provide a novel device of this type which will reduce the amount of shock which occurs when a person is being rescued by a helicopter or slow flying aircraft.

Further objects and advantages of the present invention will be apparent from the following detailed description, reference being had to the accompanying drawings wherein preferred embodiments of the present invention are shown.

In the drawings:

FIG. 1 is a perspective view of a descent control device embodying the teachings of the present invention, said device being of the type which can be worn by individuals who work on elevated structures, the device being shown in operative position;

FIG. 2 is an enlarged front elevational view of the device of FIG. 1, shown in the operative position with the cover member closed;

FIG. 3 is a bottom plan view of the device shown in FIG. 2;

FIG. 4 is a top plan view of the device shown in FIG. 2;

FIG. 5 is a horizontal sectional view taken on the line 5—5 in FIG. 2;

FIG. 6 is a perspective view (partially in cross section) of a modified construction for general useage, as for lowering heavy objects from buildings and the like, and with aircraft;

FIG. 7 is a horizontal sectional view taken on the line 7—7 in FIG. 6;

FIG. 8 is a perspective view (partially in cross section) of another modified construction which includes means for mechanically controlling the rate of descent;

FIG. 9 is a somewhat schematic perspective view of yet another modified constructon shown in combination with a parachute; and FIG. 10 is an enlarged front elevational view (partially in section) of the device shown in FIG. 9.

Referring to the drawings more particularly by reference numerals, specifically FIGS. 1 through 5, 12 indicates generally a descent control device constructed in accordance with the teachings of the present invention, shown removably attached to a workman's belt 14 by means of a hook catch 16 of conventional construction, the latter engaging a ring 18 fastened to the belt by means of a tab 20.

The descent control device 12 includes a central elongated shaft portion 22 of circular cross section, the outer surface of which is preferably polished, and having a lower hub 24 with an end face 26 at one end and an upper hub 28 with an end face 30 at the other end thereof.

Formed in the center of the end face 26 is a cavity 32 (FIG. 2) which receives a spring biased detent 34. Generally axially extending, diametrically opposed grooves or slots 36 with smooth inner surfaces are formed in the hub 24, the bottom portions of the slots 36 being coextensive with the outer surface of the shaft portion 22, and the innermost ends of the slots being flared outwardly as at 38 (FIG. 2) for a purpose to appear.

The upper hub 28 contains a single, axially extending groove or slot 40 which is preferably in axial alignment with one of the slots 36 for ease of machining and which also has a smooth inner surface co-extensive with the outer surface of the shaft portion and which has the inner end thereof flared outwardly as at 42. As will be discussed more fully hereinafter, the hub 28 could be provided with two such slots but there is no particular advantage in doing so.

Extending from the end face 30 of the hub 28 in a plane normal to the plane of the slots is a flange 44 which contains an opening 46 for receiving one part of the hook catch 16. A pin 48 extends transversely through the flame 44 so as to pivotally support one end of a U-shaped bar-like bracket 50, the free end of the bracket containing a tongue 52 which is provided with an opening 54 for receiving the end of the detent 34. As shown in FIG. 2, the tip of the tongue 52 is curved slightly away from the hub so as to ride over the end of the detent 34 when the bracket is moved to the closed position. Fastened to the inner face of the bracket as by rivets 55 is a trough-like cover member 56 of arcuate cross section which extends from the outer face 30 of one hub to the outer face 26 of the other hub, the diameter of the cover member 56 being only slightly greater than the diameter of the hubs.

As shown in FIG. 2, and as will be discussed more fully hereinafter, the device is used with a rope 58 which is wrapped around the shaft 22 and positioned in the slots 36 and 40, and consequently it is only necessary that the cover member 56 be of a size and shape to at least partially enclose the slots and prevent the rope 58 from slipping radially or transversely therefrom.

Assuming for example that the device is being worn on the belts of firemen who are called to work on a multistory building, the first fireman on the scene would suspend a number of ropes from the top of the building in position to hang downwardly adjacent the windows in the building. Thereafter, if the fireman found it necessary to quickly leave one of the upper floors of the building, he would merely raise the descent control device to the position shown in FIG. 2, raise the tongue 52 with one finger so as to release the bracket from the end of the hub to permit the shaft and hub assembly to swing to the position shown in broken lines in FIG. 2, pull a portion of the rope into the room, position the rope in the slot 40, wrap it around the shaft 22 a predetermined number of times, position it in one of the slots 36, and then re-engage the tongue 52 with the detent 34 so as to return the cover member to the closed position. Thereafter, the fireman could step out of the window and descend to the ground at a predetermined slow rate of speed, his descent down the rope being controlled by the number of turns of the rope around the shaft and therefore the friction between the device and the rope as the latter slips through it.

If the fireman wished to arrest his descent at any point, it would only be necessary for him to grasp the rope below the device and his movement would stop.

As mentioned hereinabove, the fireman would wind the rope 58 around the shaft 22 a predetermined number of times depending upon the desired rate of descent. Obviously, the number of turns required would depend on the weight of the fireman as well as the desired rate of descent, and would be determined by experiment before the device would be used under emergency conditions. The two slots 36 in the one hub permit a one-half turn adjustment, and the flared inner ends of the slots permit the rope to slide smoothly through the device without any abnormal stresses or friction developing at the corners of the slots.

Inasmuch as considerable heat is developed when the rope slides through the slots and around the shaft, it has been determined that it is very important to make at least the shaft and hub portions, and preferably the cover 56, from a non-ferrous material having a relatively high rate of heat conductivity, as for example aluminum, copper, brass, or magnesium. In short, it is necessary to use a material in which the heat produced at the slots and shaft will be quickly conducted through the material to the outer surfaces of the device where it can be quickly dissipated to the surrounding atmosphere by convection. It is also desirable that the material be non-corrosive relative to water or other types of vapors or liquids which may come in contact with it so as not to adversely affect the smooth surfaces of the shaft portion 22 and the slots 36 and 40.

It is also very important to use a rope which is of braided construction and which is made from a high strength, heat-resistant material such as nylon, or one of the other synthetic fibers sold under the trademarks "Dacron" and "Mylar." These materials are also advantageous in that they are rot and mildew resistant. The braided construction permits the user to descend without turning about the rope and also provides a smooth, constant, frictional drag, and, the heat-resistant feature is necessary to prevent the rope from being burned and charred during usage. Obviously, the charring of the outer surface of the rope would change the co-efficient of friction, and, if it were burned sufficiently, it might even break under the weight of the user.

As mentioned hereinabove, the cover member 56 should be of a shape and size to at least partially enclose all of the slots to prevent the rope 58 from moving transversely therefrom during usage. It is also necessary to have it open on one side to permit the shaft and hub assembly to be pivoted away from it, and the open side also permits a better circulation of air to further dissipate the heat developed during usage.

Turning to a consideration of FIGS. 6 and 7, the modified movement control device 60 shown therein is primarily for use in other than so-called emergency situations and can be employed where the device may either descend with the load or be anchored at the support and the load fastened to the rope, or it may be used when the rope is being trailed from a helicopter or slow flying aircraft for rescue purposes.

It includes a shaft 62 with an upper hub 64 at one end and a lower hub 66 at the other end thereof. The upper hub is provided with a single axially extending slot 68 and the lower hub is provided with two diametrically opposed axially extending slots 70, one of which is preferably in axial alignment with the slot 68 for ease in machining. As in the construction previously described, the surface of the shaft and the inner surfaces of the slots are smooth and coextensive and the inner ends of the slots are also flared outwardly to provide a smooth arcuate surface to receive the rope which has been wrapped around the shaft.

An upper flange 72 with an aperture 74 therein extends from the end of the upper hub 64, and a similarly constructed lower flange 76 with an aperture 78 depends from the end of the lower hub 66.

A cylindrical sleeve 80 is slidably mounted on the hubs and is removably attached thereto by means of a screw 82 which engages one of the hubs.

In use, the sleeve 80 is removed from the device, a length of rope inserted through the sleeve, wrapped around the shaft 62 and positioned in the slots 68 and 70, and the sleeve then repositioned on the device and secured in place. Thereafter, the upper end of the rope 84 can be secured to a support and the load fastened to the lower flange 76, or, the upper flange 72 can be secured to a support and the load fastened to the lower end of the rope which extends through the device. The latter method of usage is preferred because it permits the user to completely control the movement of the load, whereas when using the first-mentioned method, the rate of descent would have to be predetermined based on the weight of the load.

The embodiment shown in FIGS. 6 and 7 is especially suitable for use on construction jobs, in load lowering and raising operations, and in similar situations where speed of attachment is not essential and where the device may travel with the load or remain with the support. It also may be preferred because of the relatively inexpensive and simple construction.

FIG. 8 shows another embodiment of the present invention which includes a shaft 86 provided with hubs 88 similar in construction to the ones previously described, and which also includes a removable cylindrical cover 90. It differs from the modification shown in FIG. 6, however, in that an elongated supporting bracket 92 extends axially upwardly from the upper hub 88 and contains an aperture 94 at the upper end thereof.

Projecting transversely from the supporting member 92 adjacent the center thereof is a shaft 96 with a threaded outer end. A semicircular guard member 98 with projecting fingers 100 is fastened to the supporting bracket at the inner end of the shaft 96 as by rivets 102. A reel 104 with a handle 106 is rotatably mounted on the shaft and washers 108 and 110 are provided at opposite sides thereof. Mounted on the outer end of the shaft is another washer 112 and a thumb nut 114, and a coiled spring 116 is positioned between the two washers 110 and 112.

In use, a rope 118 is wound on the reel 104 in a conventional manner (with the inner end of the rope fastened to the reel) and the free end thereof is positioned around the shaft 86 and in the slots in the end hubs 88 in the manner previously described. Thus, with the supporting bracket fastened to a hook or the like, as by means of the aperture 94, a load can be fastened to the lower end of the rope 118 and lowered at a predetermined rate by permitting the rope 118 to pass freely through the slots and around the shafts as previously described. However, if it is desired to automatically decrease the rate of descent after the load has started downwardly, this can be accomplished by merely rotating the wing nut 114 so as to further compress the spring 116 and thereby increase the frictional resistance of the washer 110 against the outer face of the reel 104. Thus, for example, it may be advantageous to have a relatively rapid descent at first, followed by a relatively slow descent as the load approaches the ground. This can be accomplished by merely rotating the wing nut 114 in the manner previously described.

After the load has been released, the wing nut 114 can be loosened and the rope 118 quickly and easily rewound on the reel by rotating it by means of the handle 106. Although the guard member 98 and the fingers 100 are not absolutely necessary, they do prevent the rope from coming off the reel 104 during the usage thereof.

Yet another embodiment of the present invention is shown in FIGS. 9 and 10, and is used to reduce the shock caused by the opening of a parachute or the like. Thus, a device 120 is provided with a shaft 122 having hubs 124 at each end thereof, each of said hubs containing one or more slots or grooves formed and shaped in the same manner as previously described. A cylindrical sleeve 126, similar to the construction previously described, is also removably mounted on the hubs 124.

Extending from the outer end of the upper hub is a plate-like flange or bracket 128 which contains an aperture 130 in axial alignment with the shaft and which also rotatably supports a small reel 132 positioned transversely of the aperture 130. A rope 134 has one end portion wound about the reel and the end fastened to the reel or reel shaft. The remaining portion of the rope is positioned about the shaft 122 and in the slots in the hubs in the manner previously described, and the portion of the rope which extends from the device is fastened to the parachute harness 136 of the user. A short line 138 has one end connected to the device 120 by means of the aperture 130 and the other end thereof is connected to the shroud lines of a parachute 140.

One of the surprising and interesting characteristics of this device is that when a force is suddenly applied to the portion of the rope which depends from it, the rope will pass through the device at a relatively rapid rate of speed until several feet of rope have passed therethrough, and then the speed will be smoothly and steadily reduced to the relatively slow rate of relative movement between the rope and the device which will continue thereafter. Consequently, when the chute 140 opens and the descent of the jumper is suddenly arrested, the rope 138 will at first pass through the device at a relatively high rate of speed, and then, after several feet of rope have passed therethrough, the speed of the rope passing through the device will gradually decrease to a relatively slow rate until all of the rope has been paid from the reel 132. By this time, however, the jumper and parachute are descending at substantially the same rate and there is no reason for relative movement between them.

It will be readily apparent from the above description of the device 120 that the invention embodied in the various modifications disclosed herein is not limited to arresting the descent of a person or a load, but that it can also be used in arresting the movement of aircraft landing on carriers, stopping speeding automobiles without injuring the occupants, and in arresting the movement of sleds and the like used in testing rocket propulsion devices.

In addition, it can also be used where the load is being moved upwardly as in rescue operations. Thus, a device of the type described can be used for trailing a rope from a helicopter or slow flying aircraft so that when the person being rescued from the water, for example, grasps the rope, the rope initially slides through the device at a relatively rapid rate so as to reduce the amount of shock.

Thus, it is apparent that there has been provided several modifications of a movement control device which fulfill all of the objects and advantages sought therefor.

The device is relatively simple in construction and operation, and because of the limited number of parts it is also relatively inexpensive to manufacture. It can be used for the controlled descent or ascent of loads or individuals, and because it is relatively small and light in weight, it can be carried by individuals who work on high structures and who may have to quickly descend from those structures under emergency conditions.

It is to be understood that the foregoing description and the accompanying drawings have been given only by way of illustration and example and that changes and alterations in the present disclosure which will be readily apparent to one skilled in the art are contemplated as within the scope of the present invention.

We claim:

1. A movement control device for use with a length of rope, comprising:
   a body member including a shaft portion with a hub portion adjacent each end thereof;
   at least one generally axially extending slot in each hub portion of a size to slidably receive said rope;
   an attachment bracket extending from one of said hub portions; and
   a trough-like cover member pivotally mounted on the body member adjacent said one hub portion and movable between an open position in which the slots are exposed and a closed position in which the slots are at least partially enclosed to prevent the rope from moving transversely out of said slots during usage.

2. A movement control device for use with a length of rope, comprising:
- a body member including a shaft portion with a hub portion adjacent each end thereof;
- at least one generally axially extending slot in each hub portion of a size to slidably receive said rope;
- an attachment bracket extending from one of said hub portions;
- releasable detent means adjacent the other of said hub portions; and
- a trough-like cover member pivotally mounted on the body member adjacent said one hub portion and movable between an open position away from said hub portions and a closed position adjacent said hub portions, said cover member including means for engagement with the detent means for releasably maintaining the cover member in the closed position.

3. A movement control device for use with a rope, comprising:
- an elongated shaft portion of substantially uniform cross section with a smooth outer surface free of recesses, said shaft portion being of a length to receive varying turns of rope thereabout;
- a hub portion adjacent each end of the shaft portion;
- at least one slot with an inner surface contained in each hub portion, each of said slots being of a size to slidably receive a rope and having the inner surface thereof coextensive with the outer surface of the shaft portion; and
- attachment means connected to at least one hub portion.

4. A movement control device for use with a rope, comprising:
- a body member made from a non-ferrous material which has a relatively high rate of heat conductivity so as to quickly dissipate heat produced therein, said body member including an elongated shaft portion of substantially uniform cross section with a smooth outer surface free of recesses and being of a length to receive varying turns of rope thereabout, and a hub portion adjacent each end of the shaft portion;
- at least one slot with an inner surface provided in each hub portion, each of said slots being of a size to slidably receive a rope and having the inner surface thereof co-extensive with the outer surface of said shaft portion; and attachment means connected to at least one hub portion.

5. In combination:
- a movement control device for use with a rope, having an elongated shaft portion with an outer surface free of recesses, and a hub portion adjacent each end of the shaft portion;
- at least one slot with an inner surface provided in each hub portion, each of said slots being of a size to slidably receive the rope and having the inner surface thereof coextensive with the outer surface of the shaft portion so as to guide the rope directly onto said last mentioned surface;
- attachment means at one hub portion for suspending a load from the movement control device;
- a rope extending through one slot in each hub portion and around the elongated shaft portion the number of turns required to provide the selected rate of descent of the control device relative to the rope, said rope being of braided construction to prevent the control device and the load supported thereby from rotating about the rope during the descent; and
- removable means at least partially enclosing said slots to prevent the rope from moving transversely therefrom.

6. The combination set forth in claim 5 in which the strands of the braided rope are made from high strength, heat resistant, synthetic fibrous material.

7. A movement control device for use with a rope, comprising:
- an elongated shaft portion of a length to receive varying turns of rope thereabout;
- a hub portion adjacent each end of the shaft portion;
- at least one generally axially extending slot in each hub portion of a size to slidably receive the rope;
- an attachment bracket extending from one of said hub portions; and
- a cover member having one end thereof pivotally mounted adjacent one of said hub portions and movable between an open position in which the cover member is positioned away from the shaft portion and the slots are exposed and a closed position in which said slots are at least partially enclosed to prevent the rope from moving transversely out of the slots.

8. A movement control device as set forth in claim 7 which includes detent means engageable by the end of the cover member opposite to the pivotally mounted end for releasably maintaining the cover member in the closed position.

9. A movement control device for use with a rope, comprising:
- an elongated shaft portion with a smooth, polished outer surface free of recesses,
    said shaft portion being of uniform size throughout its length;
- a hub portion adjacent each end of the shaft portion;
- at least one generally axially extending slot in each hub portion, of a size to slidably receive the rope,
    said slots having innermost ends and bottom surfaces,
    the innermost ends being flared outwardly to provide smooth arcuate surfaces and the bottom surfaces being coextensive with the outer surface of the shaft portion, whereby the rope slides freely between the slots and the outer surface of the shaft portion without binding; and
- removable means for at least partially enclosing said slots to prevent the rope from moving laterally therefrom.

10. A movement control device for use with a rope, comprising:
- an elongated shaft portion with a smooth outer surface free of recesses, said shaft portion being of a length to receive varying turns of rope thereabout;
- a hub portion adjacent each end of the shaft portion;
- a generally axially extending slot with an inner surface provided in one hub portion,
    said slot being of a size to slidably receive the rope and having the inner surface thereof coextensive with the outer surface of the shaft portion;
- two diametrically opposed, generally axially extending slots in the other hub portion, one of said slots being in axial alignment with the slot in said one hub portion,
    each of the slots in said other hub portion being of a size to slidably receive the rope and having an inner surface co-extensive with the outer surface of the body portion; and
- removable means for at least partially enclosing all of said slots to prevent the rope from moving laterally therefrom.

11. A movement control device for use with a length of rope, comprising:
- a body member including a shaft portion with a hub portion adjacent each end thereof;
- at least one slot with an inner surface contained in each hub portion each of said slots being of a size to slidably receive a rope and having the inner surface thereof coextensive with the outer surface of the shaft portion;
- means for at least partially enclosing each slot to prevent the rope from moving transversely out of the slots during usage;
- an elongated bracket extending from one hub portion;
- a reel member rotatably mounted on said bracket; and
- means for selectively retarding the rotation of said reel member.

12. A movement control device for use with a length of rope, comprising:
- a body member including a shaft portion with a hub portion adjacent each end thereof;
- at least one slot with an inner surface contained in each hub portion each of said slots being of a size to slidably receive a rope and having the inner surface thereof coextensive with the outer surface of the shaft portion;
- means for at least partially enclosing each slot to prevent the rope from moving transversely out of the slots during usage;
- an elongated bracket extending from one hub portion;
- a reel member rotatably mounted on said bracket; and
- frictional means for engagement with said reel member for retarding the movement thereof.

13. A movement control device for use with a length of rope, comprising:
- a body member including a shaft portion with a hub portion adjacent each end thereof;
- at least one slot with an inner surface contained in each hub portion each of said slots being of a size to slidably receive a rope and having the inner surface thereof coextensive with the outer surface of the shaft portion;
- means for at least partially enclosing each slot to prevent the rope from moving transversely out of the slots during usage;
- a bracket extending from one of said hub portions and containing means for attaching a line thereto; and
- means for supporting said length of rope on said bracket in a coiled position with one end thereof in frictional engagement with said body member.

References Cited by the Examiner

UNITED STATES PATENTS

| | | | |
|---|---|---|---|
| 386,237 | 7/1888 | Budd | 188—65.4 |
| 536,866 | 4/1895 | Fitzgerald | 188—65.3 |
| 1,103,849 | 7/1914 | Stenborg | 182—5 |
| 1,115,603 | 11/1914 | Smith | 188—65.4 |
| 1,187,754 | 6/1916 | Lyra | 188—65.4 |
| 2,482,052 | 9/1949 | Zachary | 132—40 |
| 2,680,577 | 6/1954 | Frieder | 188—65.5 |
| 2,682,272 | 6/1954 | Hopkins | 132—41 |

FOREIGN PATENTS 800,862  5/1936  France.

HARRISON R. MOSELEY, *Primary Examiner.*

R. P. MACHADO, *Assistant Examiner.*